United States Patent [19]

Frandsen et al.

[11] Patent Number: 5,159,005
[45] Date of Patent: Oct. 27, 1992

[54] POLYMER COMPOSITION AND A METHOD OF PRODUCING THE SAME

[75] Inventors: Erik Frandsen, Odense; Rolando Mazzone, Asperup, both of Denmark

[73] Assignees: A/S Haustrup Plastic, Langeskov; A/S PLM Haustrup Holding, Odense, both of Denmark

[21] Appl. No.: 634,873
[22] PCT Filed: Jul. 6, 1989
[86] PCT No.: PCT/SE89/00388
§ 371 Date: Jan. 8, 1991
§ 102(e) Date: Jan. 8, 1991
[87] PCT Pub. No.: WO90/00504
PCT Pub. Date: Jan. 25, 1990

[30] Foreign Application Priority Data

Jul. 11, 1988 [SE] Sweden ................ 8802610

[51] Int. Cl.$^5$ .............................. C08K 3/32
[52] U.S. Cl. .................... 524/413; 524/403; 524/435; 524/602; 524/605
[58] Field of Search ........... 524/403, 413, 435, 602, 524/605

[56] References Cited

U.S. PATENT DOCUMENTS 4,104,466 8/1978 Tsuchida et al. ............ 546/2
4,198,792 4/1980 Christensen et al. ........... 524/855

FOREIGN PATENT DOCUMENTS 0083826 7/1983 European Pat. Off. .

OTHER PUBLICATIONS

Chemical Abstracts, vol. 91, (1979), Abstract No. 58055s, Jpn. Kokai Tokkyo Koho 79 38,287.

Primary Examiner—Paul R. Michl
Assistant Examiner—Edward Cain
Attorney, Agent, or Firm—Ladas & Parry

[57] ABSTRACT

A polymer composition for manufacturing containers, intermediate forms or parts thereof for improving their oxygen barrier properties is described. According to the invention the composition contains as an active component a metal compound having capacity to scavenge oxygen and consisting of a metal ion having complexing properties and a polymer to which the metal ion is combined as a complex.

A method of producing said polymer composition is also described, according to which a polymer is treated with a metal compound dissolved or slurried in a volatile solvent composition during refluxing conditions for obtaining the active component having capacity to scavenge oxygen. The polymer composition in admixture with a further polymer can be molded into containers, intermediate forms or parts thereof.

15 Claims, No Drawings

POLYMER COMPOSITION AND A METHOD OF PRODUCING THE SAME

FIELD OF THE INVENTION

The present invention relates to a polymer/plastic composition intended for producing articles of the general type comprising containers, intermediate forms or parts thereof for improving their barrier properties, especially for improving the capacity to withstand the passage of oxygen. The invention further relates to a method of producing the polymer composition.

BACKGROUND

Within the packaging industry, there is a progressive change towards the use of containers of plastic material. This relates to both containers for beverages, including carbonated beverages, and containers for foods. As far as foods are concerned, there is an express desire in the art also to be able to employ containers of plastic material for the storage of preserved foods. In all of these fields of application, insufficient barrier properties of the plastic material—and in particular its insufficient capacity to prevent the passage of gases, for example oxygen, vaporized liquids such as water vapor etc cause the shelf-life and durability of the products stored in the containers to be insufficient.

A number of proposals have been put forward in the art to solve the above problem, but, hitherto, the proposed techniques have failed to meet established demands of cost in combination with barrier properties in order that containers of plastic material may successfully be employed within the above-outlined sectors. Examples of solutions proposed in the art are laminates in which two or more layers of plastic material are employed and each layer possesses properties by which for instance, gas penetration, light penetration or moisture penetration are reduced. Solutions in which, for example, a metal such as aluminum is encapsulated between the plastic materials or, for instance, forms the inner surface of the container have also been suggested in the art. Such a solution is expensive and makes it difficult, if not impossible, to apply molding techniques conventionally employed in the plastic industry. Solutions in which barrier material other than metal is applied interiorly or in layers between the plastic material have further been proposed. Such solutions suffer from the drawback that they are expensive and, in addition, reduce the possibilities of recycling and reuse of the material, unless special measures are adopted in conjunction with the recovery process to remove the barrier material before the plastic material is reused.

Solutions are also known in the art in which plastic materials of different types are mixed and thereafter molded to form containers by substantially conventional methods. Thus, for example, it is previously known to produce containers of plastic material in which the plastic material consists of a mixture of PET and a polyamide. In the production of such containers the two materials are thoroughly intermixed in isolation from the outer ambient atmosphere, the thus mixed material is fed to an injection molding machine where the mixture is melted, and the molten mixture is injection molded to form a preform which is rapidly cooled for the formation of amorphous material, whereupon the preform, after heating, is expanded to form a container.

In the technique described above a certain reduction of the so-called permeability coefficient for oxygen will be achieved. The permeability coefficient for oxygen is employed as a measure of the permeability of the material in respect of gases. For example, for containers of pure PET of a storage volume of 33 cl, a permeability coefficient for oxygen has been registered of the order of magnitude of between 3 and 4 when the containers are manufactured employing generally applied technology. In the application of the above described technology a slightly lower permeability coefficient is obtained which, nevertheless, is relatively high and is of the order of magnitude of between 1 and 3, depending upon the amount of admixed polyamide. In practical terms this implies a prolongation of the shelf-life of, for example, beer from approximately 8 weeks to approximately 16 weeks. Even though a prolongation of the shelf-life to 16 weeks may be of considerable importance, it is, nevertheless, of marginal nature in many fields of application, in particular in applications within the food industry.

SUMMARY OF THE INVENTION

An object of the invention is to provide a technique, by which it is possible to achieve a still lower permeability coefficient for oxygen.

The invention is thus related to a polymer composition for manufacturing an article of the type comprising containers, intermediate forms or parts thereof to confer high oxygen barrier properties thereto and the composition has the features defined in the characterizing clause of claim 1.

Articles of the type above and prepared from the composition according to the invention present very high oxygen barrier properties, i.e. a substantial capacity to withstand the passage of oxygen. The effect responsible for these properties and this capacity respectively is referred to as the "scavenger"-effect. This will be described below with reference to such expressions as "consume", "destroy", "catch", "eliminate", "oxygen bonding", etc.

Although not bound by any theory it is believed that a prerequisite for achieving this "scavenger"-effect is the formation of an active metal complex, which is only possible if the polymer contains groups and/or atoms, which have the the capacity to coordinate to the metal ion and the polymer chain(s) has the ability to occupy a conformation wherein the groups and/or the atoms are present in the correct positions in relation to the metal ion. Another prerequisite is that the metal ion is present at a location in the molecular structure where forming of the complex is possible. The metal complex has ligands originating from groups and/or atoms present in the polymer or formed therefrom.

It is believed that the active metal complex acts irreversibly in that the coordinating oxygen molecule is converted to greatly oxidizing ions, for example ions of superoxides or peroxides, which further react in the "organic" plastic phase in which they are present.

DETAILED DESCRIPTION OF PREFERRED EMBODIMENTS OF THE INVENTION

Irrespective of whether the theory described above is correct or not, it may be noted that the key feature according to the invention is the capacity of the polymer composition to "scavenge" oxygen and as a consequence thereof its capacity to provide improved oxygen barrier properties in containers produced from the polymer composition or in containers where the polymer composition is a part thereof.

According to a preferred embodiment, the polymer composition according to the invention is used as a "masterbatch", which prior to the production of the container is added to another polymer or other polymers. This is a great advantage since the possibilities as to the choice of material are increased and containers which for certain reasons are manufactured of certain plastic materials may be given oxygen barrier properties by a mixture of a relatively small amount of the composition according to the invention, provided of course that the compatibility is not jeopardized. Another advantage of the polymer composition according to the invention is that said composition can be used for an optional part of the container which is to have oxygen barrier properties. For example a wall of the container can be composed of the polymer composition. When the container is formed of several layers, at least one of the layers can consist of or contain the polymer composition according to the invention. In the case of such a multiple layer structure, it is often appropriate that such layers in contact with or subjected to the atmosphere or as an alternative situated closest to the goods stored in the container consist of or contain the polymer composition according to the invention. A further advantage of the composition according to the invention is that little or no changes are required in the technique utilized for producing the container, especially for packaging purposes. Further examples of the use of the composition according to the invention in the production of containers or parts or intermediate forms thereof will be apparent from the specification below. However, there is first a description of preferred embodiments of the composition itself.

The polymer or polymers contained in the composition are thermoplastic resins and preferably polyamides and copolyamides the latter being copolymers of polyamides and other polymers. Both aromatic and aliphatic polyamides can be used. A preferred group of polyamides are MX nylons. These are polymers containing at last 70 mol% of structural units obtained from m-xylylenediamine alone or a xylylenediamine mixture containing m-xylene-diamine and p-xylylenediamine in an amount of less than 30 % of the total amount and an $\alpha\omega$aliphatic dicarboxylic acid having 6–10 carbon atoms.

Examples of these polymers include the homopolymers such as poly-m-xylylene adipamide, poly-m-xylylene sebacamide and poly-m-xylylene speramide, copolymers such as m-xylylene/p-xylylene adipamide copolymer, m-xylylene/p-xylylene pyperamide copolymer and m-xylylene/p-xylylene azelamide copolymer, and copolymers of these homopolymer or copolymer components and aliphatic diamines such as hexamethylenediamine, cyclic diamines such as piperazine, aromatic diamines such as p-bis(2-aminoethyl)benzene, aromatic dicarboxylic acids such as terephthalic acid, lactams such as $\epsilon$-caprolactam, $\omega$-aminocarboxylic acids such as $\omega$-amino-heptoic acid and aromatic aminocarboxylic acids such as p-aminobenzoic acid.

In these MX nylons there may be incorporated polymers such as nylon 6, nylon 66, nylon 610 and nylon 11. An especially preferred aromatic polyamide is the polymer formed by the polymerization of meta-xylylenediamine $H_2NCH_2$-m-$C_6H_4$-$CH_2NH_2$ and adipic acid $HO_2C(CH_2)_4CO_2H$, for example a product manufactured and sold by Mitsubishi Gas Chemicals, Japan under the designation MXD6. A preferred polyamide of aliphatic nature is nylon 6.6. The choice of polymer is not critical as long as there are groups and/or atoms in the polymer which have the capacity to contribute to the formation of the metal complex.

According to a preferred embodiment, the metal of the metal compound forming the active component in the composition is a transition metal selected from the first, second and third transition series of the Periodic Table, i e iron, cobalt, nickel; ruthenium, rodium, palladium; and osmium, iridium and platinum.

According to another preferred embodiment, the metal of the metal compound comprises copper, manganese or zinc.

According to a most preferred embodiment of the invention which has proven appropriate for the production of a container having exceptionally high oxygen barrier properties polyamides or copolyamides are used together with ions of at least one of the metals comprising iron, cobalt, and nickel, and among these iron and cobalt are preferred, and cobalt is most preferred.

According to a further embodiment the composition is present as particles and especially as granules.

As to the amount of metal present in the polymer composition according to the invention this amount is not critical as long as the desired effect is obtained. One skilled in the art can readily determine the concentration appropriate in each case, but in general a non limiting concentration range is so wide as 500–20,000 ppm (based on weight). The lower limit is dictated by such factors as the attainable barrier effect, how rapidly this is intended to be attained, which polymer material or materials with which the composition shall be mixed, the goods to be packed in the container, etc and the upper limit is dictated by such factors as economy and toxicity.

As to the nature and the proportion of the polymer or the polymers to be admixed into the polymer composition according to the invention, the following may be noted. As to the choice of material the only requirement to be met is the compatibility of the materials. In other words the material must be compatible both from a chemical and a physical point of view. As to the rest one skilled in the art can without difficulty select the material or the materials appropriate for the purposes intended. However, as non-limiting examples polyethylene, polypropylene, polyvinyl chloride, polyethylenterephthalate (PET), copolymers thereof, etc may be mentioned. Generally, but not necessarily, the polymer which is intended to be admixed in the polymer composition differs from the polymer on which the polymer composition is based. The proportions between the polymer(s) admixed into the composition and the polymer composition vary within very broad limits and depend on such differing factors as the intended barrier effect, use, intended shelf-life of the container, economical factors, reuse aspects, etc. Thus, the proportions between the polymer(s) admixed into the composition and the polymer composition may vary widely. As a general rule it may be said that it has proven appropriate to use a polymer composition which is relatively concentrated in relation to the metal and to add such composition in a relatively small amount to the polymer or the polymers selected in view of the factors mentioned above. As a non-limiting example is a mixture comprising PET and a polymer composition according to the invention based on a polyamide in which case the amount of the polymer composition is only up to 10 percent by weight. In this case it is primarily strength properties which dictate the amount of the polymer composition. In other cases a greater amount of polymer composition for admixture into a polymer or polymers conventionally used for the production of containers is permissible.

Results of measurements of the permeability coefficient for oxygen in the case of containers produced from PET and a polymer composition based on nylon 6.6 according to the invention, in the proportions of 96 % PET and 4 % of the polymer composition (having a cobalt content of about 5000 ppm) have revealed figures below the lower limit of the registration capability of the measurement equipment which corresponded to a level of 0.01-0.05. These figures should be compared with the permeability coefficients mentioned previously in this specification of values at about 1-3 for containers produced without the polymer composition according to the invention. A plurality of measurements have shown the same tendency for considerably improved permeability coefficients for oxygen.

The invention also contemplates a method of producing a polymer composition of the kind defined above for the manufacture of an article and the method has the characterizing features appearing from the independent method claim.

In the method of producing the polymer composition a volatile solvent or mixture of solvents is used, in which later case all the solvents present in the mixture need not be volatile. According to a preferred embodiment ethanol, preferably 96 % ethanol is used as the solvent.

For performing the method, the polymer, preferably in the form of granules or pellets, is refluxed with a metal compound dissolved or suspended as a slurry in a volatile solvent or mixture of solvents for a sufficient time period to form the active oxygen consuming component of the composition. One skilled in the art can readily determine the length of the time period during which the refluxing takes place and the time period is not critical to the invention.

According to a preferred embodiment a salt is used as the metal compound in performing the method of the invention, the salt preferably comprising halides, especially chlorides, of the preferred metals mentioned above, among which particularly iron, cobalt and nickel should be mentioned. The choice of the salt to be used depends on the solubility thereof in the solvent or mixture of solvents and the time that it takes to form the active component is proportionately less the greater the solubility of the metal salt is. The anion of the metal compound can be inorganic, for example a chloride, or organic, for example, an acetate or stearate.

The invention will be further described below in detail with reference to working examples.

EXAMPLE 1

500 g nylon 6.6 ("Ultramid", BASF) in the form of granules were refluxed for about 24 h with 500 ml of an ethanolic (96%) solution of cobalt chloride (CoC12.6-H$_2$O) at a concentration of 0.24 g/ml. After refluxing during said time period the granules were dried and the cobalt content was found to be 7000 ppm.

EXAMPLE 2

The procedure according to Example 1 was repeated but this time poly-meta-xylylene-adipamide (a polymer manufactured and sold by Mitsubishi Gas Chemicals Co., Japan under the designation "MXD6") was used instead of nylon 6.6. The cobalt content of the dried granules was about 4500 ppm (mean value). By increasing the concentration of cobalt chloride in the solution and the proportion between the amount of solution and the amount of polyamide, granules of nylon 6.6 having a cobalt content of 20,000 ppm in accordance with example 1 and in accordance with Example 2 granules of poly-meta-xylylene-adipamide having a cobalt content of 9000 ppm were prepared. Testing of the dried granules according to Examples 1 and 2 revealed that the actual polymer was not saturated with metal ions.

EXAMPLE 3

The procedure according to Example 2 was repeated but this time iron chloride and nickel chloride respectively were used as the metal compound in a concentration of 0.24 g/ml. As the polymer "MXD6" was used. By varying the amount of solution in relation to the amount of polyamide granules, various metal contents were obtained.

EXAMPLE 4

The procedure of Example 1 was repeated but this time various salts of metals selected from the palladium group and the platinum group i.e. ruthenium, rodium and palladium and osmium, iridium and platinum respectively were used.

Further examples of preferred embodiments will be described below, which especially relate to preferred techniques according to the invention for manufacturing articles of the type referred to above such as containers (including intermediates or parts thereof) and to various polymer materials in applying such techniques.

Mixture A: 98 percent by weight of PET and 2 percent by weight of the polymer composition according to Example 1.

Mixture B: 96 percent by weight of PET and 4 % by weight of the polymer composition according to Example 2.

Mixture C: 90 percent by weight of polypropylene and 10 percent by weight of the composition according to Example 1.

Mixture D: 96 percent by weight of LD-polyethylene and 4 percent by weight of the composition according to Example 2.

From each of the mixtures described above containers and/or parts thereof were manufactured using the technique described below by way of example. For the sake of completeness it should be mentioned that both the polymer composition according to the invention and the polymer intended to be mixed therewith were present in the form of granules and that they were subjected to drying conditions before feeding for example into an injection molding machine. Said drying conditions are such adapted to the properties of the plastic material selected. According to a preferred embodiment, the granules of the polymer and the granules of the polymer composition were dried separately prior to being mixed together. Reference is made below to Mixture A, but experiments have been made, as mentioned above, using mixtures B-D in the technique mentioned below.

After having been dried, for example at a temperature of 100°-140° C. for 6-8 h, granules, in a preferred embodiment comprising PET and cobalt containing "MXD6", were fed into an injection molding machine where, in accordance with conventional techniques, they were melted and a preform was injection molded from the molten material. The material was held in the compression section of the injection molding machine at a temperature within the range of between 255° and 280° C., preferably within the range of between 260° and 275° C., and also in the injection nozzle generally within the same temperature range. The material of the preform was rapidly cooled so as to make the material amorphous. The amorphous preform was subsequently re-shaped into a container. In certain physical applications, this was effected by expanding the preform of amorphous material in the axial direction and/or in its circumferential direction into an intermediate preform which, hence, consisted of thinner material than the preform and preferably of at least monoaxially oriented material. The intermediate preform was subsequently subjected to further expansion so as to form the final shape of the container. In other physical applications, the preform was converted into the container in a single forming stage.

In one preferred embodiment, the intermediate preform was formed according to the technique described in U.S. Pat. No. 4,405,546 and GB 2 168 315. The technology described in these two patent specifications entails that the material in the walls of the preform passes, under temperature control, through a gap by means of which the material thickness is reduced at the same time as the material is stretched in the axial direction of the preform. There will hereby be obtained a monoaxial orientation of the material in the axial direction of the preform. As a rule, the gap width is sufficiently small to produce material flow in the transition zone between amorphous material and material of reduced wall thickness, i.e. oriented material. A mandrel is inserted in the thus formed intermediate preform, the circumference of the mandrel in its cross-section being greater than that of the intermediate preform, whereby the intermediate preform is expanded in its circumferential direction. By this expansion, there will be obtained favorably close contact between the material wall of the intermediate preform and the outer defining surface of the mandrel. In experiments, the mandrel had a surface temperature in excess of 90° C., preferably exceeding 150° C., which caused the oriented material to undergo shrinkage in the axial direction of the preform. In experiments, it surprisingly proved possible to carry out material shrinkage within a very wide temperature range, namely between 90° and 245° C. As a result of heat treatment, the material also obtained a thermal crystallization in addition to the crystallization which occurred through the orientation of the material. Appropriately, the expanded and axially shrunk intermediate preform was thereafter trimmed so as to form a uniform edge at its discharge opening and in addition the mouth was reshaped as necessary to become adapted to a closure or seal.

In one further embodiment, a preform was prepared with the use of a so called multi-layer injection molding machine, i.e. an injection molding machine having a multi layer nozzle, the flow delivered by the nozzle comprising PET and the polymer composition in accordance with Example 1 above. A preform was prepared by means of said machine, the preform having a circular cross section and a closed bottom. The outside layer of the preform consisted of PET and the inside layer thereof consisted of the composition according to Example 1.

In a further embodiment granules comprising mixture B above were fed, after drying, into an injection molding machine of conventional type to form a container in one single step.

Certain preferred embodiments have been described above concerning the application of the present invention, i.e. in manufacturing containers, especially for packaging purposes, including embodiments where multi layer structures have been used. However, the invention is not limited to these embodiments but it is within the competence of one skilled in the art to apply any techniques previously known for manufacturing containers of the type in question.

Containers manufactured from the mixtures A-D above exhibited permeability coefficients for oxygen of between 0.1 and 0.01. Thus, these containers are especially well suited to those cases where the contents of the container require high oxygen barrier properties.

In summary, according to one aspect of the invention, a master batch is provided, which after admixture with conventional polymers and after shaping to containers, intermediate forms or parts thereof provides improved oxygen barrier properties therefor corresponding to a factor of improvement exceeding 100. This represents a great progress within the packaging field.

Throughout the specification and claims "intermediate forms" means preforms and/or intermediate preforms of containers, said preforms being moldable to form containers. "Parts thereof" means for example a wall of a preform, a wall of a container, a mouth part, a layer or layers of a container, such as the inner and outer layers of a multilayer container or those of a preform, etc.

The invention is not limited to the preferred embodiments described above, and variations are possible to one skilled in the art within the scope of the invention as defined in the attached claims.

What is claimed is:

1. A wall of a container having high oxygen barrier properties comprising a molded polymer composition formed by melting granules of said composition, injection molding the melted composition to produce a preform and expanding the preform, said composition comprising a granular mixture of (1) a first polymer providing essential strength for the container wall and (2) an active component comprising a metal compound capable of scavenging oxygen and consisting essentially of a metal ion having complexing properties and a polymer to which said metal ion is combined as a metal complex in the molded polymer composition of said wall to scavenge oxygen.

2. A wall as claimed in claim 1, wherein said metal compound is a metal complex having ligands originating from said polymer of said active component.

3. A wall as claimed in claim 1 wherein said second polymer is a polyamide or a copolyamide.

4. A wall as claimed in claim 1 wherein said metal ion is iron, cobalt, nickel, platinum metals, palladium metals, copper or manganese.

5. A wall as claimed in claim 4 wherein said second polymer is poly-m-xylylene-adipamide or nylon 6.6.

6. A wall as claimed in claim 1 wherein said active component is present in an amount up to 10% by weight of the polymer composition.

7. A wall of a container as claimed in claim 1 wherein said first polymer is PET.

8. A wall of a container as claimed in claim 7 wherein said metal in the metal compound is iron, cobalt, nickel, platinum metals, palladium metals, copper or manganese, said polymer of the active component being a polyamide or copolyamide.

9. A wall of a container as claimed in claim 8 wherein the active component is present in an amount up to 10% by weight of the polymer composition.

10. A wall as claimed in claim 1 wherein said metal is present in said complex in an amount of 500-20,000 ppm.

11. A wall as claimed in claim 1 wherein said polymer of said active component is an aromatic or aliphatic polyamide.

12. A method of producing a container having a wall with high oxygen barrier properties, said method comprising forming a granular mixture of (1) a first polymer composition providing essential strength for the wall of a container, and (2) a second polymer composition by reacting a polymer with a metal compound contained in a volatile solvent composition under refluxing conditions to obtain an active component having capacity to scavenge oxygen, the active component consisting essentially of a metal ion having complexing properties as a metal complex with said polymer, producing a preform from the granular mixture and molding the preform by expansion to form the container wall in which said metal complex scavenges oxygen.

13. A method as claimed in claim 12 wherein said polymer of the second polymer composition is reacted with the metal compound in amounts for producing said active compound with amounts of metal between 500 and 20,000 ppm.

14. A method as claimed in claim 12 wherein said first polymer composition comprises polyethylene terephthalate.

15. A method as claimed in claim 12, wherein said polymer of said active component is an aromatic or aliphatic polyamide.

* * * * *